United States Patent [19]
Oglesby et al.

[11] Patent Number: 4,944,570
[45] Date of Patent: Jul. 31, 1990

[54] FIBER OPTIC CABLE HAVING AN EXTENDED ELONGATION WINDOW

[75] Inventors: Michael L. Oglesby, Kansas City, Mo.; Kenneth E. Cornelison, Overland Park, Kans.

[73] Assignee: Alcatel NA, Inc., Hickory, N.C.

[21] Appl. No.: 361,823

[22] Filed: Jun. 30, 1989

Related U.S. Application Data

[63] Continuation of Ser. No. 16,103, Feb. 18, 1987, abandoned.

[51] Int. Cl.$^5$ ............................................. G02B 6/44
[52] U.S. Cl. .................................................. 350/96.23
[58] Field of Search ..................................... 350/96.23

[56] References Cited

U.S. PATENT DOCUMENTS

| Re. 32,293 | 11/1986 | Dey et al. | 350/96.23 |
|---|---|---|---|
| Re. 32,374 | 3/1987 | Dey et al. | 350/96.23 |
| 3,955,878 | 5/1976 | Nowak | 350/96 R |
| 4,389,088 | 6/1983 | Trezequet | 350/96.23 |
| 4,491,386 | 1/1985 | Negishi et al. | 350/96.23 |
| 4,491,387 | 1/1985 | Dey et al. | 350/96.23 |
| 4,514,058 | 4/1985 | Walton | 350/96.23 |
| 4,632,506 | 12/1986 | Taylor | 350/96.23 |
| 4,671,610 | 6/1987 | Kitayama et al. | 350/96.23 |
| 4,775,213 | 10/1988 | Kitayama | 350/96.23 |
| 4,793,686 | 12/1988 | Saito | 350/96.23 |
| 4,832,443 | 5/1989 | Cameron et al. | 350/96.23 |
| 4,840,453 | 6/1989 | Kitayama | 250/96.23 |

FOREIGN PATENT DOCUMENTS

| 0076637 | 4/1983 | European Pat. Off. | 350/96.23 |
|---|---|---|---|
| 0146757 | 7/1985 | European Pat. Off. | 350/96.23 |
| 2064163 | 6/1981 | United Kingdom | 350/96.23 |
| 2157848 | 10/1985 | United Kingdom | 350/96.23 |

OTHER PUBLICATIONS

Printed Publication, "NTT Develops New Cable Housing 600 Optic Fibers", in Electronic Engineering Times, Jun. 2, 1986.

*Primary Examiner*—John D. Lee
*Assistant Examiner*—Phan T. Heartney
*Attorney, Agent, or Firm*—Peter C. Van Der Sluys

[57] ABSTRACT

The present invention is directed toward a fiber optic cable comprising a central core which has one or more helical channels in its periphery. One or more tubes containing a dielectric water-blocking compound and one or more optical fibers are positioned in the channels. The fibers are randomly arranged within the tubes in such a way that tensile stresses on the cable are not transmitted to them, thus providing an elongation window. Finally, the assembly formed by the core and the tube or tubes is wrapped with a serving of metal wires. In one embodiment, the core and tubes may be wrapped with a tape layer before the outer metal wires are applied. Any interstices among the core, the tube or tubes, and tape may also be filled with another dielectric water-blocking compound.

35 Claims, 3 Drawing Sheets

FIBER OPTIC CABLE HAVING AN EXTENDED ELONGATION WINDOW

This is a continuation of co-pending application Ser. No. 07/016,103 filed on Feb. 18, 1987, (now abandoned).

The present application is related to co-pending application Ser. No. 016,128, filed Feb. 18, 1986, by Michael L. Oglesby et al. and entitled "Process and Apparatus For Making Fiber Optic Cable" (Pat. No. 4,757,675).

BACKGROUND

The present invention relates to fiber optic telecommunication cables and static- wires used with overhead high-voltage power transmission lines.

With the advent of fiber optics, high-volume communication no longer requires the use of bulky copper cables. For example, a single glass fiber having a coated diameter of only 250 micrometers can transmit information at a rate of 565 million bits (about 35,000 typed pages) per second. The "all-dielectric" (non-conducting) attribute of fiber optic cables permits their use in applications unsuitable for metal cables, such as along existing utility power transmission rights of way, since the problems associated with induced voltages are avoided.

Although seemingly fragile, the glass fibers are individually very strong; short-length fibers have shown tensile strengths between 400 KPSI and 800 KPSI at elongations ranging from 4% to 8%. However, telecommunication grade fibers are proof-tested over their entire length only at stresses from 50 KPSI to 100 KPSI. Thus, glass defects that may cause fracture at larger stresses will not be detected and removed. Furthermore, long-term stress even below the short-term proof-test level can cause fatigue failure due to the slow progress of flaws in an otherwise acceptable fiber. Since fiber cables are subjected to various tensile stresses during normal installation and use, a cable design which minimizes the transfer of these loads to the fibers will have increased reliability.

Outdoor, above-ground installations subject cables to a wide variety of rigors. During installation, an overhead cable is passed through a series of installation blocks under relatively low stringing tension and then raised to the design tension of the line: typically in the range of 1,000 to 5,000 lbs for a 500-foot span. The overhead cables called static wires typically have rated breaking strengths in the range of 10,000 lbs to 30,000 lbs. In-service tension can increase to 60% of the rated strength as a result of severe weather conditions such as ice loading; under extraordinary conditions, the tension can increase to as much as 95% of the rated strength. The cable must withstand the environmental temperature range of $-40°$ C. to $+70°$ C. and the resulting cyclical expansion/contraction of the cable should be isolated from the fibers to avoid fatigue failures. The fibers also must be protected from the elements, especially water, and from hydrogen because it is well-known that these can cause increased attenuation in silica glass fibers. Thus, besides being water-tight and corrosion-resistant, the cable materials should allow any hydrogen generated to diffuse to the atmosphere.

A typical overhead installation is that for high-voltage power transmission via conductors suspended from a series of towers or pylons. For efficiency, a load-balanced delta connection may be used having one conductor for each of the three electrical phases. Whether from a lightning strike or other electrical disturbance, one or more of the phase conductors is occasionally unable to carry its share of the power. To avoid a total loss of the transmission system in that case, auxiliary conductors called static wires are often provided to carry the fault currents. The static wires are normally suspended above the phase conductors from the same transmission towers and thus are also exposed to lightning surge currents. As already observed, it is advantageous to carry the fiber cables along existing utility rights of way. However, restrictions on use may prevent simply suspending another cable from the transmission towers. Accordingly, an optical cable that can also function as a static wire provides the significant benefit of allowing the use of existing rights of way for telecommunication.

A fiber optic cable that can be used as a static wire is disclosed in U.S. Pat. Nos. 4,416,508 and 4,491,387. Several embodiments of the cable include one or more fibers enclosed in a tube which is then inserted in the axial bore of a metal member that can take various shapes. The metal member is then wrapped with metal wires which provide the cable's strength. The cables allow some undefined degree of relative movement of the cable elements and the relationship between the lengths of the fibers, tubes, and metal members is uncontrolled. Another optical cable that can be used as a static wire is disclosed in U.S. Pat. No. 4,514,058. One embodiment of the cable includes a central slotted metal member with optical fibers or electrical conductors secured in the slots and then wrapped with metal wires. The very strong central support and the strong wires together resist tensile and radial loads applied to the cable.

Another fiber cable design that can be employed as a static wire is an aluminum pipe formed around a dielectric core tube containing the optical fibers. The longitudinal seam of the pipe may be welded to provide mechanical and environmental protection for the core and the pipe may be wrapped with aluminum-clad steel wires to provide the necessary tensile strength. Use of aluminum provides the high conductivity necessary for the cable's function as a static wire and as an occasional lightning target. However, this approach relies mainly on the rigidity and elasticity of the pipe's wall for resisting the radial force applied when the cable is pulled around a bend or sheave wheel. This force, also known as "sidewall pressure", can permanently flatten the pipe if the elastic limit of the pipe material is exceeded. Since radial forces of 1,000 to 5,000 lb/ft can be expected during typical cable installations, a bend radius of less than 200 to 300 times the pipe diameter results in permanent deformation, even for high strength aluminum. Since a typical bend radius for static wire is 12 inches, aluminum pipes having diameters of 0.3 to 0.4 inches are permanently flattened during normal installation as static wires. This deformation can result in excessive attenuation in the optical fibers due to pressure exerted on the core by the pipe.

Several additional fiber cable designs are disclosed in U.S. Pat. Nos. 3,955,878, No. 4,388,800, No. 4,389,088 and No. 4,491,386 which are directed to submarine installations. In general, the cables disclosed attempt to protect the fibers from tensile stresses by simply twisting them into helices thus increasing their lengths relative to the cable lengths. Single fibers are laid directly into channels in the cable core so that when the cables are stretched, the extra length of the fibers prevents transmission of the cable elongation to the fibers.

SUMMARY

Accordingly, it is an object of the present invention to provide a fiber optic cable with increased mechanical integrity and improved optical fiber protection.

It is another object of the present invention to provide a fiber optic cable with improved thermal performance.

It is a further object of the present invention to provide an optical static wire with mechanical and electrical properties similar to conventional static wires.

The present invention provides an optical fiber cable comprising a central core which has one or more helical channels of a given twist direction or lay in its periphery. One or more tubes containing a suitable dielectric water-blocking compound and optical fibers are positioned in the helical channels: one tube per channel. The fibers, one or more per tube, are randomly arranged within the tubes and the tubes, the fibers and the channels are arranged in such a way that stresses from cable elongation less than a predetermined value are not transmitted to them, thus providing an elongation window. Finally, the assembly formed of the core and the tube or tubes is wrapped with metal wires.

In another embodiment, the core and the tube or tubes are wrapped with a tape layer which provides them with mechanical and environmental protection. Any interstices among the core, the tube or tubes, and the tape may be filled with another dielectric water-blocking compound.

In other embodiments, the cable may include inner and outer protective sheaths of an extrudable thermoplastic material such as polyethylene or polyvinylchloride. The outer sheath may also be a suitably impregnated covering of jute or similar material. Also, a strength member comprising one or more longitudinally applied or braided or wrapped fibrous elements such as polyaramide fibers may be included in the cable to provide a high strength-to-weight ratio.

BRIEF DESCRIPTION OF THE DRAWINGS

The present invention will be understood from the following detailed description read in conjunction with the drawings in which.

DESCRIPTION OF THE PREFERRED EMBODIMENT

Figure 1:
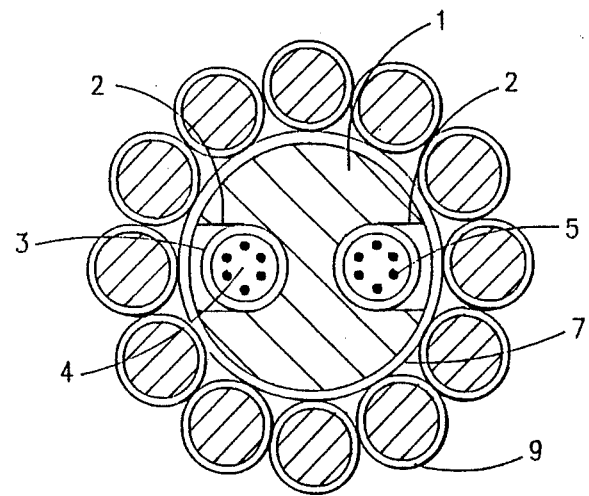
FIG. 1 shows a cross-section of an optical static wire according to the present invention.

In accordance with the present invention, FIG. 1 shows an embodiment suitable for use as an optical static wire. A core 1 consisting of an aluminum rod provides direct support for radial forces and resistance to flattening. The core 1 has one or more channels 2 formed in its periphery; the channels 2 are helically twisted with either right-hand or left-hand twist direction or lay. In another embodiment of the invention, the lay of the helical channels can reverse periodically. The channels 2 are preferably of a cross-section small enough with respect to the diameter of the core 1 and of an appropriate helical pitch such that the core acts essentially as a solid rod. It has been found that satisfactory performance is provided by an optical static wire having a helical pitch of the channels in the range of 1.5 inches to 4.0 inches.

Within each of the channels 2 is a flexible dielectric tube 3, such as a high-melting-point fluoropolymer material, which is positioned to fit snugly in the channel 2 and not protrude beyond the periphery of the core 1. Each tube 3 contains one or more optical fibers 5 and a flexible dielectric water-blocking compound 4, such as silicone gel, which is capable of withstanding the anticipated temperature extremes due to the environment and to lightning and fault currents. The flexible compound 4 helps to maintain the position of the fibers 5 in the tube 3, but the compound must allow the fibers to move. Suitable tube-filling compounds are thixotropic and hydrophobic, as well as thermally, chemically and dimensionally stable in both the short and long term. The tube and dielectric compound, besides having good thermal performance, evolve only trace amounts of hydrogen at normal and elevated temperatures and have stable physical properties. Any hydrogen which is generated diffuses freely through the dielectric compound 4 and the tube 3 and away from the fibers 5. It has been found that satisfactory performance is provided by an optical static wire having a diameter of the helical path of the center lines of the buffer tubes in the range of 0.15 inch to 0.60 inch. The arrangement of the fibers 5 within the tubes 3 is described in more detail below in regard to FIG. 2.

Also shown in FIG. 1 is a helically applied, overlapped aluminum tape 7. The aluminum tape, in conjunction with the tubes 3 and dielectric compound 4, provides a mechanical and environmental barrier for the fibers 5. This type of barrier offers several advantages over a cable design based on a sealed pipe as described above. Although the assembly of the tape wrap 7, the tubes 3 and the core 1 is effectively sealed against the adverse effects of water and moisture, any hydrogen within the core is free to escape through the overlap areas of the tape 7. The hydrogen concentration around the fibers 5 is thus minimized, and excessive fiber attenuation is avoided. The conductive tape also provides an electrical connection between the core 1 and a serving of wires 9, allowing fault and lightning currents to be carried throughout the static wire. The temperature rise due to resistive heating or to possible electrical breakdown of a dielectric tape is thus minimized in those applications requiring the fiber cable to carry significant electrical currents. Further, use of a tape and a core of identical materials prevents electrolytic corrosion that occurs with the contact of dissimilar metals.

In another embodiment of the present invention, any interstices among the tape 7, the tubes 3 and the core 1 are also filled with the dielectric water-blocking compound 4, or another suitable dielectric water-blocking compound with similar properties that may or may not be thermosetting. For some environmental conditions the metal tape 7 may be excluded in another embodiment of the present invention. In this embodiment, water can freely exit the cable so that moderate freezing conditions do not damage the cable.

The assembly of the tape, tubes and core are wrapped with a stranded serving of conductive wires 9. The wires 9 are preferably aluminum-clad steel to provide compatibility with the tape 7 and avoid electrolytic corrosion as discussed above. Aluminum-clad wires have nearly the same strength as conventional galvanized steel wires, yet they weigh as much as 15% less. The aluminum cladding also provides the high conductivity necessary for good fault current and lightning surge current carrying capability. The wires 9 provide the major portion of the strength of the fiber optic cable; the core 1 need not provide significant additional tensile strength for the cable. The steel component of the wires 9 resists most of the creep that might otherwise occur in the aluminum components of the cable due to the tensile loads of an overhead installation. Although twelve wires 9 are shown in FIG. 1, the tensile strength or fault current capacity can be varied by changing the gauge and/or the number of wires. The rated breaking strength of a static wire according to the present invention is thus related to the size, the number and the type of wires in the outer layer.

Figure 2A:
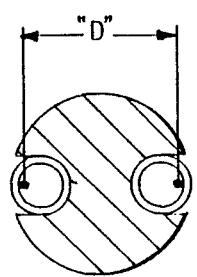
FIG. 2a shows a detailed cross-section of the core and tubes of the fiber optic cable of the present invention for one condition of cable elongation.
Figure 2B:
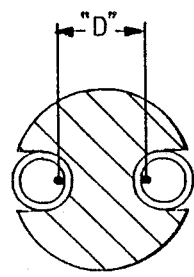
FIG. 2b shows a detailed cross-section of the core and tubes of the fiber optic cable of the present invention for another condition of cable elongation.

The present invention isolates the optical fibers from axial tensile stresses on the fiber cable by loosely buffering the fibers 5 within the tubes 3 that are helically twisted. This arrangement of the fibers 5 is achieved by using fibers with comparatively small coated diameters in a tube having a comparatively large inside diameter. When the tube is twisted into a helix, the fibers are free to move radially as the pitch and diameter of the helix varies with cable elongation or contraction. The action of the fibers is shown in FIG. 2; FIG. 2a shows the fiber position when the cable is contracted and FIG. 2b shows the fiber position when the cable is stretched. Axial strain on the fibers is thus prevented and the fibers are isolated from cable-length changes. The cable strain which can occur before any substantial increase in fiber strain occurs is called the elongation window and can be calculated from the following expression:

$$\frac{\Delta L}{L} = \frac{\pi^2 D \Delta D}{L^2}$$

where L is the helix pitch length, $\Delta L$ is the change in cable length over that helix pitch length for which no axial fiber strain occurs, D is the diameter of the tube/fiber helix and $\Delta D$ is the change in helix diameter of the tube.

The cable elongation window is achieved by controlling the helical pitch of the channels, the inside diameter of the tubes, the ratio of the linear fiber length to the linear tube length, and the diameter of the fiber or tube helix. Insufficient fiber- to tube-length ratios can allow stress to be transmitted to the fibers with possible breakage during installation and/or use, while excessive fiber- to tube-length ratios can cause greater optical transmission losses due to fiber bends in the tubes. The fibers are typically inserted in parallel into the tubes in a machine in which they are pulled from reels under controlled tension into the cross-head of an extruder which forms the tubes. After extrusion the tubes are cooled. The fiber tension and the cooling characteristics, such as the amount of shrinkage, of the tubes are key variables in determining the fiber-length to tube-length ratio. It has been found that satisfactory performance is obtained with an optical static wire having tubes with an inside diameter in the range of 0.03 inch to 0.10 inch and a fiber-length/tube-length ratio in the range of 1.001 to 1.005.

Twisting the tubes and therefore the fibers into helices does produce a slight bending stress on the fibers due to the curvature of the helical path. By selecting the diameter and the pitch length of the helix the strain at the fiber surfaces can be held to as little as 0.1%, a value well below the fibers' proof test level. Also, this bending strain does not occur throughout the fiber cross-section so it has less effect on fatigue failure than a uniform cross-sectional tension.

Positioning the fibers in a filled tube provides an impervious moisture barrier that prevents fiber failure due to the stresses induced by freeze/thaw thermal cycles which an optical static wire exposed to the elements must endure. Also, the tubes allow the fibers to be brought away from the power line while they are still protected, thus easing the requirements on fiber termination and coupling. Tubes of high-melting-point dielectric material also thermally isolate and protect the fibers from cable temperature rises caused by lightning surges and fault currents to which a static wire is exposed. Suitable tubes are resistant to kinking and radial compression while still flexible, and are relatively inert chemically and stable thermally.

Figure 3:
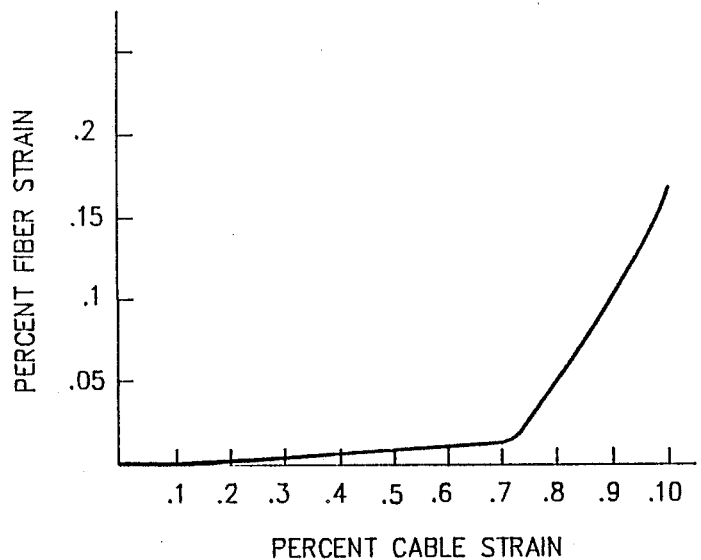
FIG. 3 shows the relation between cable strain and fiber strain for the optical static wire of FIG. 1.

An optical static wire in accordance with the present invention has been fabricated and tested. The cable had an overall diameter of 0.507 inch and a weight of 0.352 lb/ft, with a rated break strength, using standard ASTM methods, of 17,200 lb. Tensile strength was provided by twelve #10 AWG aluminum-clad steel wires. The cable had a fault current capacity of 65 kiloamp$^2$-sec and a fiber capacity of 2 to 12 arranged in two tubes. FIG. 3 shows the wide elongation window which was achieved by the optical static wire. The fiber strain was essentially zero for cable strains beyond the 0.3% to 0.4% which may occur during heavy tensile loading conditions. Even for extraordinary cable strains of 1%, such as might occur in the event of a tower failure, the fiber stress did not exceed the proof-test level of the fibers. The optical static wire in accordance with the present invention has an elongation window greater than 0.5%, while typical optical telecommunication cables may achieve only 0.3%.

The optical static wire closely resembled conventional static wire in strength and sag characteristics. The aluminum core resulted in a slightly lower elasticity modulus for the cable and a higher thermal expansion coefficient. Since the optical wire was different from conventional wire in both diameter and weight, the optical wire was tensioned at 5,500 lb rather than 4,500 lb to achieve the same sag as conventional wire at 60° F.

Figure 4:
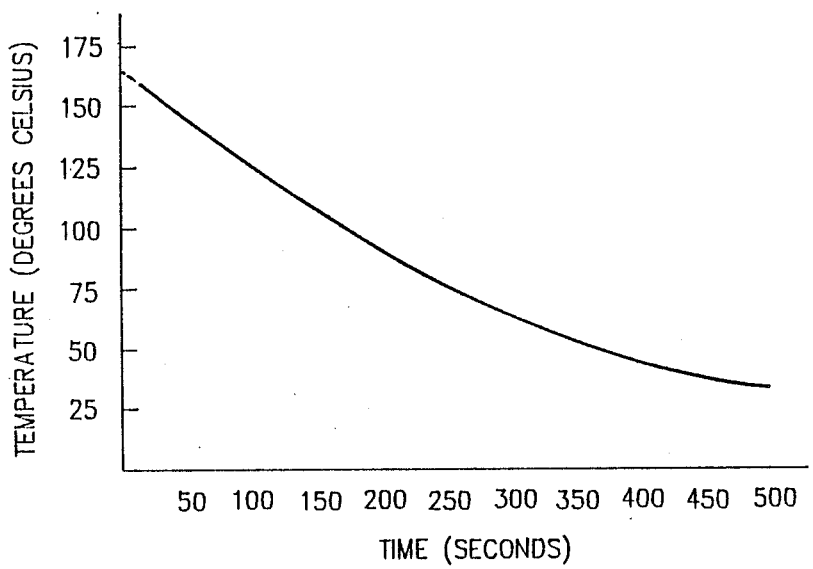
FIG. 4 shows the thermal performance of the optical static wire of FIG. 1 after a typical fault current.

The optical cable was also tested to verify its electrical performance as a static wire. Should faults in the phase conductors occur, a static wire must be capable of carrying the fault current until circuit breakers interrupt the power transmission circuit. Tests were conducted to measure the ability of the cable to withstand the current surge and still maintain acceptable optical transmission characteristics by isolating the fibers from the increased cable temperatures. FIG. 4 shows the results of a test in which the fault current energy was 66 kiloamps$^2$-sec produced by a 60-Hz current of about 0.56 seconds duration. The peak cable temperature was extrapolated to 163° C. (the dashed line) and the figure shows the measured exponential decrease (the solid line) of the cable temperature after cessation of the fault current. The optical transmission characteristics of the fibers were verified by simulated data transmission at 135 megabits per second; no increase in bit-error-rate was detected. After the tests, the cable was dissected; no damage to the cable components was observed.

Figure 5:
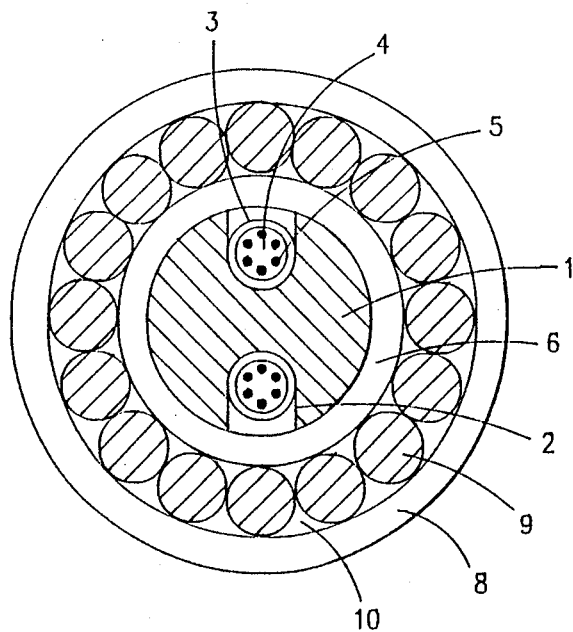
FIG. 5 shows a cross-section of a submarine cable according to the present invention.

FIG. 5 shows another embodiment of the present invention which is suitable for use as a submarine cable where one or more of the attributes of an extended elongation window, a high resistance to sidewall pressure and a high tensile strength are important. The construction of the cable shown in FIG. 5 is similar to that shown in FIG. 1 except that the helically applied, overlapped tape 7 is replaced by an inner protective sheath 6 of an extrudable thermoplastic material such as polyethylene or polyvinylchloride. Additional elements shown in FIG. 5 are an outer protective sheath 8 over the stranded serving of wires 9, and an optional flexible water-blocking compound 10 which fills any interstices among the wires 9, the inner sheath 6 and the outer sheath 8. The outer sheath 8 may be an extrudable thermoplastic material such as polyethylene or polyvinylchloride, or it may be another appropriate material such as suitably impregnated jute or the like to protect the cable from water penetration.

Figure 6:
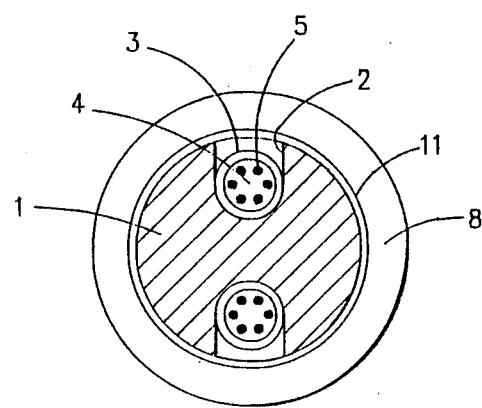
FIG. 6 shows a cross-section of a high strength-to-weight ratio cable according to the present invention.

FIG. 6 shows another embodiment of the present invention in which a cable is provided which has a high strength-to-weight ratio. Such a cable finds particular applicability in drilling operations such as oil explorations where signals from or to downhole sensors must be monitored or provided. As shown in FIG. 6, the high strength-to-weight ratio cable comprises a metal core 1 having one or more helical channels 2 in its periphery. The channels 2 each contain a dielectric tube 3 which further contains one or more optical fibers 5 and a flexible dielectric water-blocking compound 4. These elements are as already described in relation to preceding embodiments of the present invention. The cable shown in FIG. 6 further comprises a strength member 11 of one or more longitudinally applied or braided or helically wrapped fibrous elements such as polyaramide fibers. Polyaramide fibers are marketed by duPont Co. under the trade name KEVLAR. The strength member 11 is covered by an outer protective sheath 8 of an extrudable thermoplastic material, such as polyethylene or polyvinylchloride, or suitably impregnated coverings of jute or similar materials.

The present invention has been described in relation to particular embodiments which are intended in all respects to be illustrative rather than restrictive. Alternative embodiments will become apparent to those of ordinary skill in the art to which the present invention pertains without departing from its spirit and scope. For example, high conductivity may be provided by any appropriate material other than aluminum, or may even be disregarded altogether in applications not requiring it. Accordingly, the scope of the present invention is defined by the appended claims rather than the foregoing description.

What is claimed is:

1. A fiber optic cable suitable for use as an overhead static wire, comprising:
   an electrically conducting core having at least one helical channel with a predetermined lay in its periphery;
   a tube containing a dielectric water-blocking compound and at least one optical fiber randomly arranged within the tube, the tube being positioned within said helical channel, and the tube, the optical fiber and the helical channel being arranged to provide an elongation window greater than 0.5%; and
   a plurality of metal wires wrapped around and in electrical contact with the core, and providing at least the major portion of the tensile strength for the cable.

2. The cable of claim 1, further comprising a dielectric water-blocking compound filling interstices between the tube, the core and the metal wires.

3. The cable of claim 1, wherein the lay of the helical channel reverses peridically.

4. The cable of claim 1, wherein the core has a plurality of helical channels, and the cable comprises a plurality of tubes, with a tube containing at least one optical fiber positioned within each channel.

5. The cable of claim 1 further comprising a helically-wrapped overlapping layer of an electrically conducting tape disposed around said tube and the core and providing electrical contact between said core and said metal wires.

6. The cable of claim 5 wherein each of said core, said tape and said metal wires includes the same conductive material.

7. The cable of claim 6 wherein said conductive material is aluminum.

8. The cable of claim 7 wherein said metal wires are aluminum-clad steel wires.

9. The cable of claim 1, wherein the tube comprises a heat-resistant dielectric hydrogen gas-permeable material, whereby hydrogen gas can diffuse through the tube to the atmosphere.

10. The cable of claim 9, wherein the material of the tube is a fluoropolymer.

11. The cable of claim 2, wherein the water-blocking compound filling said tube and said interstices is hydrogen gas-permeable, whereby hydrogen gas can diffuse through the compound and escape to the atmosphere.

12. The cable of claim 1, wherein the helical channel has a pitch in the range of 1.5 to 4.0 inches, a central axis of the tube has a helical diameter in the range of 0.15 to 0.60 inch, and the tube has an inside diameter in the range of 0.03 to 0.10 inch.

13. The cable of claim 5, further comprising a dielectric water-blocking compound filling interstices between the tape layer, the tube and the core.

14. The cable of claim 5, wherein said helically-wrapped overlapping layer is wrapped to allow the escape of hydrogen gas through the overlapped areas.

15. An overhead-mounted fiber optic cable suitable for use as an overhead static wire, comprising:
   a metal electrically conducting core having at least one helical channel with a predetermined lay in its periphery;
   a tube containing a dielectric water-blocking compound and at least one optical fiber randomly arranged within the tube, the tube being positioned within the helical channel, and the tube, the optical fiber, and the helical channel being arranged to provide an elongation window greater than 0.5%; and
   a plurality of meal wires wrapped around the core and in electrical contact therewith.

16. The cable of claim 15, further comprising a dielectric water-blocking compound filling interstices between the tube, the core and the metal wires.

17. The cable of claim 15, wherein the lay of the helical channel reverses periodically.

18. The cable of claim 15, wherein the core has a plurality of helical channels, and the cable comprises a plurality of tubes, with a tube containing at least one optical fiber positioned within each channel.

19. The cable of claim 15, wherein the tube is a dielectric hydrogen gas-permeable material, whereby hydrogen gas can diffuse through the tube and escape to the atmosphere.

20. The cable of claim 19 wherein said tube is constructed of a dielectric material having a melting point greater than 150° C. optical fiber, and the helical channel being arranged to provide an elongation window; and a plurality of metal wires wrapped around the tube and the core for providing at least the major portion of the tensile strength of the cable and being in electrical contact with the core.

21. The cable of claim 19, wherein the material of the tube is a fluoropolymer.

22. The cable of claim 16, wherein the eater-blocking compound filling said tube and said interstices is hydrogen gas-permeable, whereby hydrogen gas can diffuse through the compound and escape to the atmosphere.

23. The cable of claim 15, wherein the helical channel has a pitch in the range of 1.5 to 4.0 inches, a central axis of the tube has a helical diameter in the range of 0.15 to 0.60 inch, and the tube has an inside diameter in the range of 0.03 to 0.10 inch.

24. An overhead-mounted optical static wire for carrying fault and lightning currents and for fiber optic telecommunication, comprising:

a metal electrically conducting core having at least one helical channel with a predetermined lay in its periphery;

a dielectric tube containing a dielectric water-blocking compound and at least one optical fiber randomly arranged within the tube, the tube being positioned within the helical channel, and the tube, the optical fiber and the helical channel being arranged to provide an elongation window greater than 0.5%; and a plurality of metal wires wrapped around the tube and the core for providing at least the major portion of the tensile strength of the cable and being in electrical contact with the core.

25. The optical static wire of claim 24, further comprising a dielectric water-blocking compound filling interstices between the tube, the core and the metal wires.

26. The optical static wire of claim 24, wherein the lay of the helical channel reverses periodically.

27. The optical static wire of claim 24, wherein the core has a plurality of helical channels, and the cable comprises a plurality of tubes, with a tube containing at least one optical fiber positioned within each channel.

28. The optical static wire of claim 27, wherein the core is aluminum, the tubes are fluoropolymer, and the wires are aluminum-clad steel.

29. The optical static wire of claim 28, wherein each of the tubes contains a plurality of optical fibers.

30. The optical static wire of claim 28 further including a helically-wrapped overlapping layer of an aluminum tape disposed between said aluminum core and said aluminum-clad steel wires.

31. The cable of claim 24, wherein the tube comprises a heat-resistant dielectric hydrogen gas-permeable material, whereby hydrogen gas can diffuse through the tube to the atmosphere.

32. The cable of claim 24, wherein the water-blocking compound filling said tube and said interstices is hydrogen gas-permeable, whereby hydrogen gas can diffuse through the compound and escape to the atmosphere.

33. The cable of claim 24, wherein the helical channel has a pitch in the range of 1.5 to 4.0 inches, a central axis of the tube has a helical diameter in the range of 0.15 to 0.60 inch and the tube has an inside diameter in the range of 0.03 to 0.10 inch.

34. The optical static wire of claim 30, further comprising a dielectric water-blocking compound filling interstices between the aluminum tape layer, the tube and the core.

35. The optical static wire of claim 30, wherein said helically-wrapped overlapping layer is wrapped to allow escape of hydrogen gas through the overlapped areas.

* * * * *

UNITED STATES PATENT AND TRADEMARK OFFICE
CERTIFICATE OF CORRECTION

PATENT NO. : 4,944,570

DATED : July 31, 1990

INVENTOR(S) : M. L. Oglesby and K. E. Cornelison

It is certified that error appears in the above-identified patent and that said Letters Patent is hereby corrected as shown below:

At column 9, lines 17-23, the following language is deleted:

[optical fiber, and the helical channel being arranged to provide an elongation window; and
a plurality of metal wires wrapped around the tube and the core for providing at least the major portion of the tensile strength of the cable and being in electrical contact with the core.]

At column 9, line 27, the word "eater-blocking" is deleted, and the word "water-blocking" is inserted.

Signed and Sealed this

Twenty-second Day of October, 1991

Attest:

HARRY F. MANBECK, JR.

*Attesting Officer*  *Commissioner of Patents and Trademarks*